United States Patent [19]

Chandra et al.

[11] Patent Number: 4,837,769

[45] Date of Patent: Jun. 6, 1989

[54] PHASE CONJUGATED SLAB LASER DESIGNATOR

[75] Inventors: Suresh Chandra, Falls Church, Va.; Jeffrey L. Paul, Thousand Oaks, Calif.

[73] Assignee: The United States of America as represented by the Secretary of the Army, Washington, D.C.

[21] Appl. No.: 304,622

[22] Filed: Feb. 1, 1989

[51] Int. Cl.$^4$ .............................................. H01S 3/16
[52] U.S. Cl. ...................................... 372/41; 372/93; 372/99
[58] Field of Search ................... 372/41, 108, 92, 93, 372/99, 98

[56] References Cited

U.S. PATENT DOCUMENTS

| | | | |
|---|---|---|---|
| 4,709,368 | 11/1987 | Fukuda et al. | 372/92 |
| 4,725,787 | 2/1988 | Chandra | 372/66 |
| 4,734,911 | 3/1988 | Bruesselbach | 372/99 |

Primary Examiner—Leon Scott, Jr.
Attorney, Agent, or Firm—John E. Holford; Milton W. Lee; Anthony T. Lane

[57] ABSTRACT

A portable laser designator is provided having a highly efficient slab type GSGG:Cr:Nd output laser with a phase conjugation mirror and compact folded optical system.

3 Claims, 1 Drawing Sheet

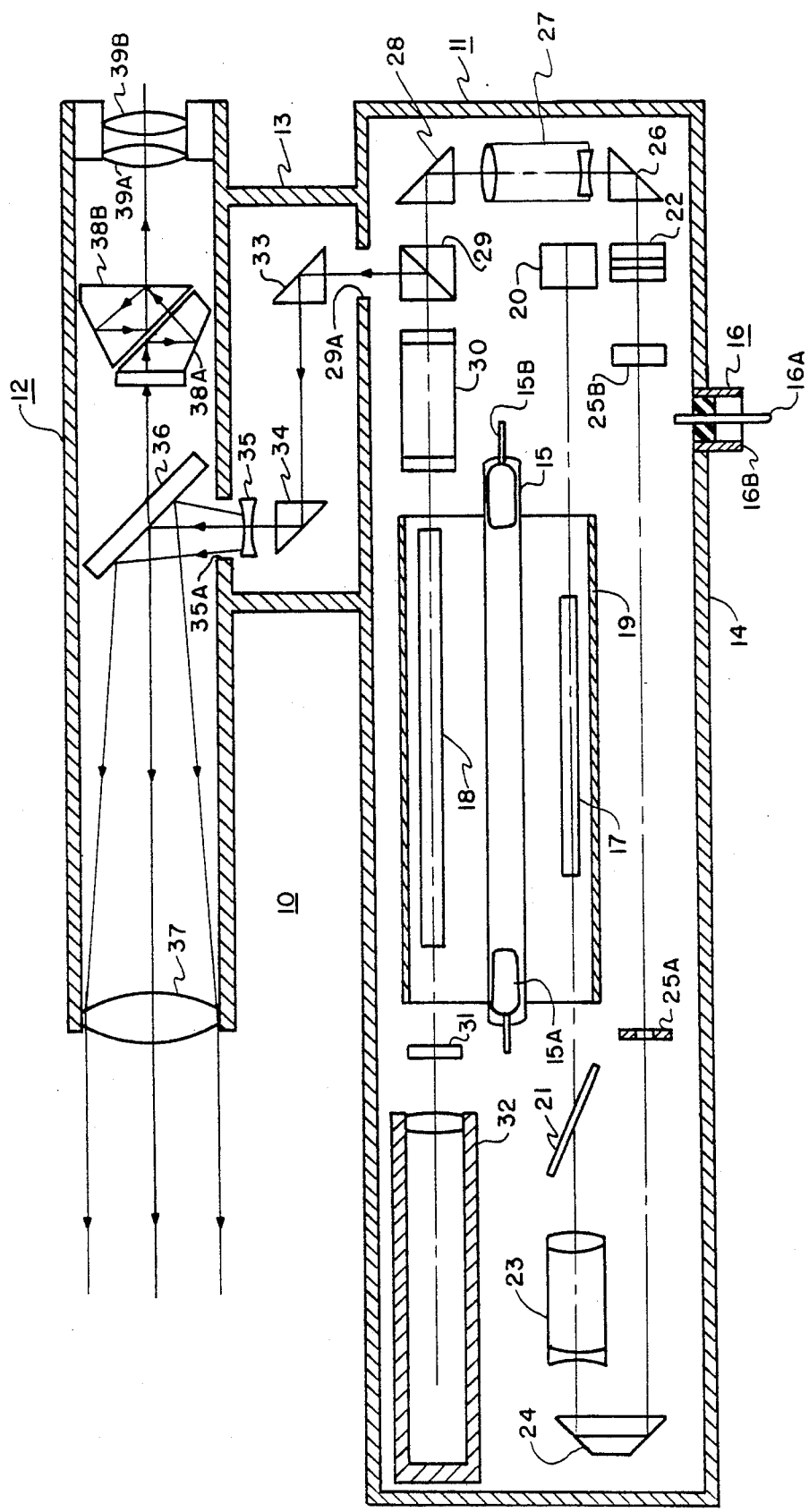

PHASE CONJUGATED SLAB LASER DESIGNATOR

The invention described herein may be manufactured, used, and licensed by the U.S. Government for governmental purposes without the payment of any royalties thereon.

BACKGROUND OF INVENTION

1. Field

The invention relates to a medium powered laser which can direct a well defined laser beam over a distance of a few miles. The beam is directed onto a target to create a source of reflected and/or secondary radiation that can be immediately detected by surveillance or weapon systems to locate, identify and, if necessary, destroy the target.

2. Prior Art

The advent of lasers has provided optical detection systems with advantages formerly found only in radar systems. Due to the small wavelengths involved, optical systems also have many advantages not attainable with radar. Optical systems are not easily countered by chaff or other false signal generators. They can ignore camouflage and identify a target by temperature variations alone. Sometimes a target that normally exhibits large temperature variations, like a tank that has been operating or exposed to strong sunlight, can be parked in the shade and left until it blends effectively into the background. An effective means to raise such targets is to illuminate them with a target designator at close range so that they can be spotted by a sophisticated long range system. Since the designator must be transported on foot to most locations it must be compact and light weight.

Low power solid state lasers using ruby rods and the like best meet this weight requirement. As explained in applicant's U.S. Pat. No. 4,725,787 for a "Phase Conjugated Hybrid Slab Laser" issued Feb. 16, 1988, the usual round rod makes a very stable reference source, but any attempt to develop the power required for effective illumination of a target produces undesirable thermal lensing and binefringence and greatly reduces the efficiency of the rod. The patent described a slab laser which is much more efficient. An object of this invention is to employ such a laser in a target designator.

SUMMARY

The invention provides a highly stable, lightweight and compact portable laser designator with greatly improved illuminating power by using a highly energy efficient GSGG:Cr:Nd (i.e. Gadolinium, Scandium, Gallium Garnet with Chromium and Neodymium) phase conjugated slab laser in a space efficient folded beam arrangement.

BRIEF DESCRIPTION OF THE DRAWINGS

The invention is best understood with reference to the drawings wherein.

FIG. 1 shows a cutaway view of a target designator according to the present invention.

DESCRIPTION OF THE PREFERRED EMBODIMENT

Referring to FIG. 1 there is shown the designator 10. It has two major components which are the electro-optical unit 11 and a telescope 12. The two units are joined by a wall section 13, which defines an enclosed chamber there between, the floor of which is formed by the top of unit 11 and the ceiling by the bottom of unit 12. The floor and ceiling each contain an aperture 11A or 12A, respectively, for optical communication between the units. The chamber houses a few optical elements which will be described presently.

The electro-optical unit is surrounded by an elongated metal or plastic electrical housing 14 which is cylindrical and may be circular or rectangular in cross-section A. laser pump 15 comprising a Xenon gas discharge tube or the like is positioned along the axis of the electrical housing. A power supply connector 16 provides two electrodes 16A and 16B at least one of which (16A) is insulated from the electrical housing. The end electrodes 15A and 15B of the pump or flashtube 15 are coupled to electrodes 16A and 16B, respectively, by conductors (not shown) which may include the housing 14, if appropriate. The portable power supply may be any standard design for flashtube use. The weight and bulk of such power supplies resides in the charging batteries and discharge capacitors, which supply the steady input charging current and large output current pulses, respectively, required by the tube.

The pump 15 has a dual function which involves pumping an oscillator rod 17 and laser slab 18. A reflector 19 surrounds these three elements to prevent pump radiation from escaping and to focus all but a small fraction of this radiation on slab 18. The laser oscillator cavity is bounded by the porro prism 20 and the resonant reflector 22. At low levels of excitation, the saturable absorber 21 (e.g. a dye Q switch), set at Brewsters angle, keeps the cavity Q at a low value. As the excitation builds, the absorber bleaches out and the cavity switches to a high Q value. At this point a high Q cavity is established between the partial reflector (resonant reflector) 22 and reflector 20. A first (two-power) telescope 23 enlarges the beam diameter (reducing the beam reflected from element 22) and the larger beam is redirected by a large corner reflector 24 through an alignment wedge 25 to reflector 22. The wedge 25 fine tunes the cavity and may be used to enhance mode purity.

The polarized waves which leak past reflector 22 are redirected by right angle prism 26 to a second telescope 27 that further increases the beam diameter. The beam leaving the second telescope passes undisturbed through a polarizer 29 and enters a third telescope 30. This last telescope expands the beam cross-section in one dimension to nearly fill the rectangular cross-section of the laser slab 18. After the rectangular beam emerges from the slab it passes through a quarter-wave plate 31 oriented at 45° to the beam polarization, causing it to become circularly polarized. The circularly polarized beam then enters a stimulated-Brillouin-scattering (SBS) cell 32 which acts as a phase conjugate reflector.

The laser beam reflected by the phase conjugator again passes through quarter-wave plate 31 to become cross-polarized with respect to the original beam polarization and exactly retraces its path through slab 18 for further amplification as well as cancellation of wavefront distortions produced on its initial pass through the slab. Telescope 30 reduces the rectangular reflected beam to its previous smaller and circular cross section, so that it can be reflected through the small aperture 29A (now that it is cross-polarized) by polarizer 29 into chamber 13. The beam traverses the chamber by reflecting off the chamber's right angle prisms 33 and 34 to enter the telescope. As it passes through the lens 35 in aperture 35A between the chamber 13 and telescope 12 the beam is widened by lens 35 to fill the reflecting mirror 36. The reflecting mirror in turn directs the diffraction-limited beam through the objective lens to the target.

The reflecting surface of the mirror is designed to reflect only light in the frequency range of the laser. The incorporation of certain metals in the glass will achieve this or coatings may be added according to techniques well known in the art. Likewise reflections in the visible range can be reduced with appropriate coatings. Thus the visible image of the target formed by the objective lens 37 may be projected through mirror 36 and folding prisms 38A and 38B to the eyepiece lenses 39A and 39B. The folding prisms greatly reduce the length of the telescope while retaining the required focal length to provide a very compact structure.

The use of GSGG:Cr:Nd as the lasing material for the oscillator and slab amplifier in this single pump structure increases the efficiency of the designator 100% over previous models. Thus existing batteries and capacitors will last twice or long or the weight of both may be halved to provide greater portability.

We claim:

1. A laser designator; comprising
    a laser pump means;
    a high power phase conjugated slab laser amplifier formed of GSGG:Cr:Nd as a lasing material on one side of said pump means;
    a low power rod shaped laser oscillator on the opposite side of said pump means;
    and a first plurality of optical reflecting and refracting means for directing and shaping a laser beam which surrounds said pump means and passes through said rod and slab; and
    a telescope means coupled to said beam to direct it to a distant target.

2. A designator according to claim 1, wherein:
    said rod, slab and pump are mounted in an elongated cylindrical housing;
    said telescope is mounted parallel to said housing; and
    a second plurality of reflecting and refracting means are mounted between said housing and said telescope to direct said beam through the objective lens of said telescope.

3. A designator according to claim 2 wherein a third plurality of reflecting and refracting means are mounted in said telescope to separate said laser beam from visible light reflected from said target through said objective lens to the eyepiece of the telescope and to fold the focal length of said telescope.

* * * * *